(No Model.)
J. D. SHRIGLEY.
Combined Seed Drill and Rolling Cutter.
No. 235,029.  Patented Nov. 30, 1880.
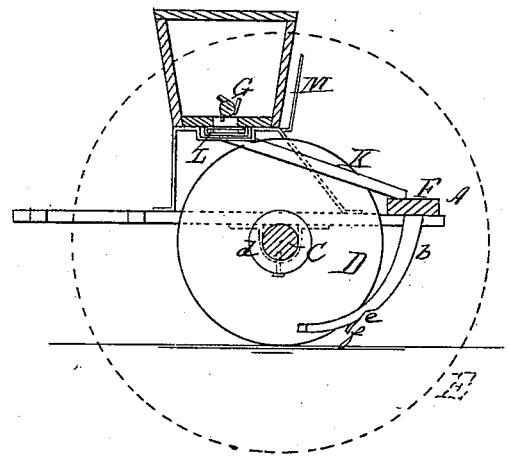
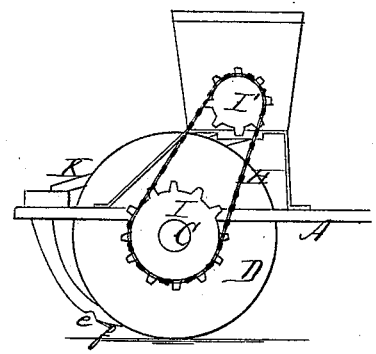
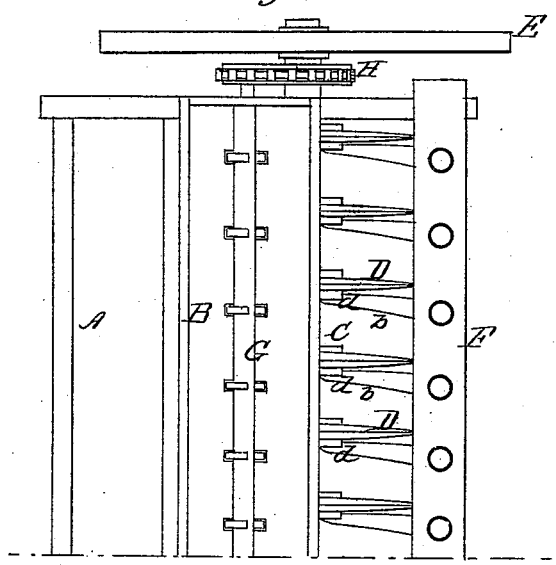
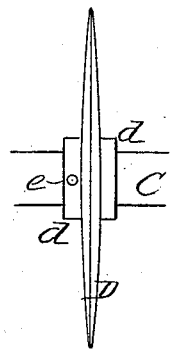
Witnesses:  Inventor:

United States Patent Office.

J. DILL SHRIGLEY, OF IOWA CITY, IOWA.

COMBINED SEED-DRILL AND ROLLING CUTTER.

SPECIFICATION forming part of Letters Patent No. 235,029, dated November 30, 1880.

Application filed September 22, 1880. (No model.)

*To all whom it may concern:*

Be it known that I, J. DILL SHRIGLEY, of Iowa City, in the county of Johnson and State of Iowa, have invented certain new and useful Improvements in Combined Seed-Drills and Rolling Cutters; and I do hereby declare that the following is a full, clear, and exact description of the invention, which will enable others skilled in the art to which it appertains to make and use the same, reference being had to the accompanying drawings, which form a part of this specification, in which—

Figure 1 is a vertical section. Fig. 2 is a side elevation. Fig. 3 is a plan view, and Fig. 4 is a detail view.

This invention has relation to a combined wheat-drill and rolling cutter; and it consists in the novel construction, arrangement, and combination of parts, as hereinafter described and claimed.

The implement embracing my improvements comprises a suitable frame, A, which supports the transverse hopper B, the curved drill-teeth $b$, and the shaft C, upon which are arranged the rolling cutters D. Said rolling cutters consist of circular disks made of cast-steel and beveled to a sharp edge. They are designed to open and clear the channels for the drill-teeth, to cut cornstalks and other obstructions, and prevent the drill-teeth from being clogged. Each cutter-disk has a hub or collar, $d$, on one side, through which the cylindrical shaft or axle C passes, the cutter being attached thereto by means of a set-screw, $e$, passing through the hub or collar, as shown.

E E are driving-wheels on the ends of the shaft C, but intended to be used only when the implement is being drawn to and from the field. These wheels are easily removed when the implement is at work, the latter then traveling on the rolling cutters alone.

The curved drill teeth or tubes $b$ extend downward and forward from a supporting-bar, F, and have flattened points terminating at one side of the cutters.

The grain-openings $e$ are behind and above the points, and are protected by shields $f$, which aid in clearing the channels formed by the cutters and drill-points, and prevent the grain-openings from being clogged.

The hopper contains a rotary toothed force-feed shaft, G, operated from the main shaft by means of a chain, H, passing over toothed pulleys I I'. The teeth of the shaft travel through openings in the bottom of the hopper, feeding the grain to spouts K, which convey it to the drill-teeth. There is an adjustable slide, L, attached to the bottom of the hopper and manipulated by a lever, M. The object of this slide is to regulate the size of the discharge-orifices and to close the same when the machine is not at work.

I claim as my invention—

1. The combined seed-drill and rolling cutter, comprising the frame A, hopper B, shaft C, drill tubes or teeth $b$, and the rolling cutters D, the points of the drill-tubes being extended forward between and close to the sides of the cutters, and the discharge-openings located above the points and on the posterior sides of the drill-teeth, substantially as described.

2. The curved drill tubes or teeth having flattened points, posterior grain-orifices, and shields, substantially as set forth.

In testimony that I claim the foregoing as my own I have hereto affixed my signature in presence of two witnesses.

J. DILL SHRIGLEY.

Witnesses:
  GEO. B. CLARK,
  FRANK OAKES.